F. W. LIETZOW & O. F. FLEISCHER.
DESICCATION PROCESS.
APPLICATION FILED MAY 29, 1912.

1,282,093.

Patented Oct. 22, 1918.
2 SHEETS—SHEET 1.

Witnesses:
Geo. C. Davison
Martha Westman

Inventors
Frederick William Lietzow
Oscar Frederick Fleischer
by Clarence Carpenter
Attorney

F. W. LIETZOW & O. F. FLEISCHER.

DESICCATION PROCESS.

APPLICATION FILED MAY 29, 1912.

1,282,093. Patented Oct. 22, 1918.

Witnesses:
Geo. C. Davison
Martha Westman

Inventors
Frederick William Lietzow
Oscar Frederick Fleischer
by Rowe Carpenter
Attorney

UNITED STATES PATENT OFFICE.

FREDERICK WILLIAM LIETZOW AND OSCAR FREDERICK FLEISCHER, OF CHICAGO, ILLINOIS, ASSIGNORS TO MERRELL-SOULE COMPANY, OF SYRACUSE, NEW YORK, A CORPORATION OF NEW YORK.

DESICCATION PROCESS.

1,282,093. Specification of Letters Patent. Patented Oct. 22, 1918.

Application filed May 29, 1912. Serial No. 700,450.

*To all whom it may concern:*

Be it known that we, FREDERICK WILLIAM LIETZOW and OSCAR FREDERICK FLEISCHER, citizens of the United States, and residents of Chicago, in the State of Illinois, have invented certain new and useful Improvements in Desiccation Processes, of which the following is a specification.

Our present invention relates to processes for the recovery in a form substantially free from moisture of the solids contained or carried in fluid or liquid substances or vehicles, or, viewed from another aspect, to processes for removing fluid, liquid or moisture from substances in order to obtain their valuable contents in the form of concentrates; the apparatus employed by us in the carrying out of the said process forming the subject matter of our co-pending application, Serial No. 679,345, filed February 23, 1912.

The invention has reference to desiccating moist substances in general; to the desiccation of fluids carrying their solid contents in suspension, more particularly; and has special reference to improved methods for recovering such solids in the form of powder or granules, and this without so altering their form or structure either mechanically or chemically that they may not be reconverted into substantially their original form upon the addition of water or other fluid equivalent to that removed by the utilization of our improvements in this art.

The principal objects of our present invention are to provide a process whereby we may effect the desiccation of substances substantially instantaneously and whereby the solids may be so rapidly and efficiently recovered that on one hand they do not become cooked or altered by too continuous an application of heat, nor on the other hand are they deposited or precipitated in a moist form owing to an inadequate supply of heat or a supply of desiccating gas of too great relative humidity; and whereby we may most efficiently effect the recovery of any desiccated particles, not precipitated at the time of desiccation, which may be carried by the gas used in the desiccation process; the provision of a simplified process of the nature referred to characterized by the employment of an improved arrangement of fluid-feed and gas feed in the desiccating apparatus; an improved relative arrangement of atomizer nozzles and gas inlets therein; improved means for precipitating the desiccated material; an improved arrangement of settling chambers and coöperating baffle members for such purpose; improved means for removing the solid contents of the apparatus or of any of the chambers therein; improved means for exhausting the gaseous contents of the apparatus without substantial loss of any solids carried in suspension therein; improved means for inducing a flow of treatment gas therethrough; and generally to improve, simplify and cheapen the cost of carrying out processes of the character stated and render them more efficient, together with certain further objects which will hereinafter appear.

Desiccation processes in use at this day, as known to us, are largely objectionable in one or more of the following respects, viz: the product, if sufficiently dried to be commercially available is apt to become cooked or overheated to such an extent as to be inferior and consequently of depreciated value, or, if not overheated it is often moist, rendering it likely to become spoiled, as by fermentation rendering it useless for many purposes, by caking rendering it less soluble, or otherwise, aside from the practical difficulties involved in removing it from the apparatus and handling it after such removal, or if the product be obtained without overheating and without an excess of moisture the production per machine is so low that the process cannot be carried out on a commercially profitable scale. On the other hand, the apparatus known to us are objectionable in this that they are, within our experience, unduly cumbersome, expensive to build, complex and consequently difficult and expensive to maintain, and inefficient both with respect to the quantity of fluid which can be efficiently handled thereby per diem and the losses due to the escape of the product obtained unless means be utilized for the recovery of the otherwise exhausted product which auxiliary means are more expensive in operation than the value of the product saved normally warrants.

While our improved process is applicable for the treatment of many substances of diverse natures, too numerous here to mention, we have found it of special value for the treatment of milk in production of milk-powder, and we have therefore, for the purpose of disclosing our invention, illustrated in the accompanying drawings an apparatus adapted for desiccation of milk, wherein:—

Figure 1:
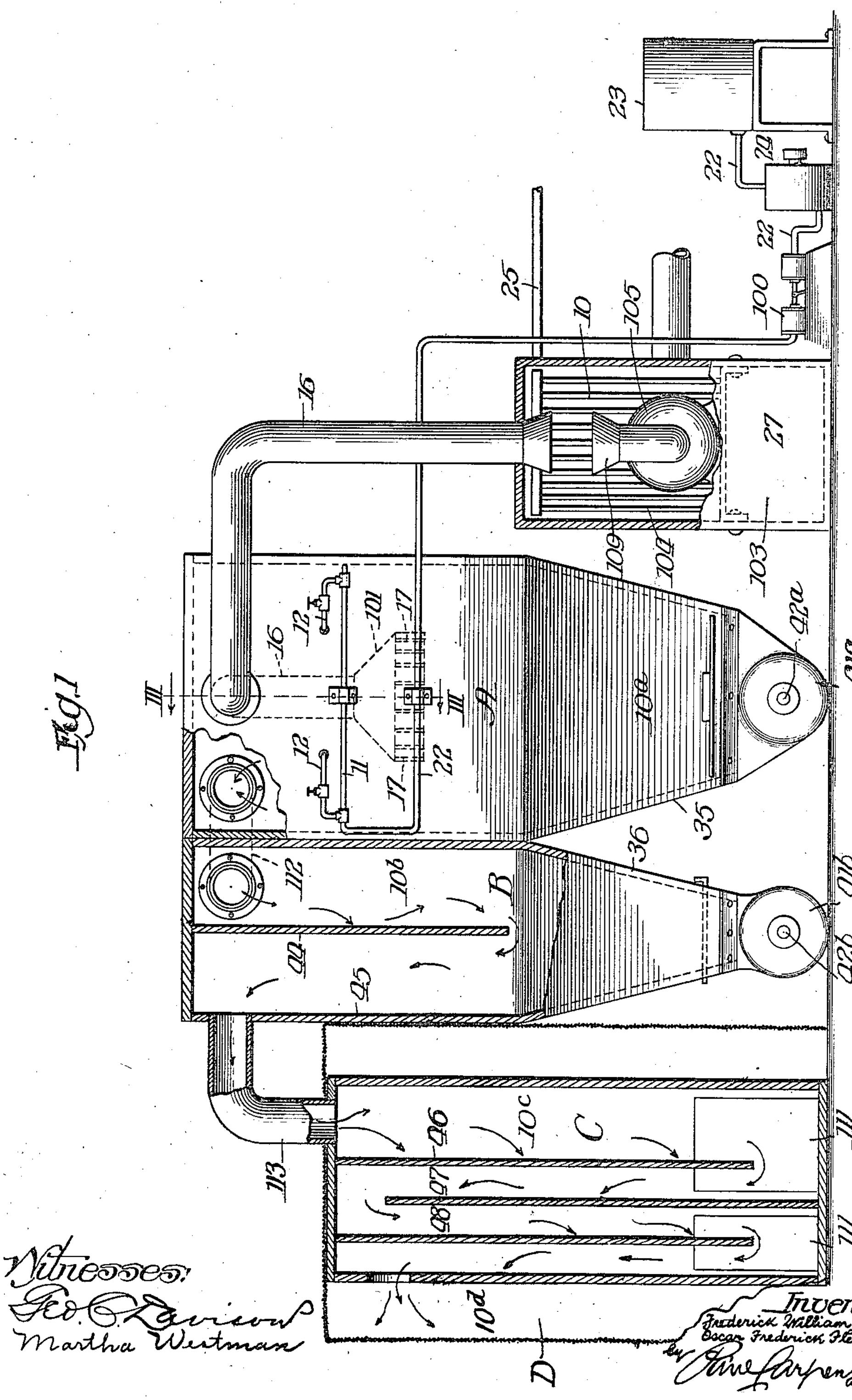
Figure 1 is a longitudinal elevational view, partly in vertical section, illustrative of a form of apparatus adapted for carrying out our improved process.

Referring now more particularly to the form of apparatus illustrated in Fig. 1, it will be observed that in the form of construction here employed by us, for convenience in erection and for certain other reasons to be hereinafter disclosed, we employ a preheating chamber 10, a desiccating chamber $10^a$, a plurality of settling chambers $10^b$, $10^c$ and $10^d$, which may be contiguous or separated as space may permit, that for introducing the milk or other substance to be treated into the desiccating chamber $10^a$, we provide a fluid supply header 11 communicating by feed pipes 12—12 with the atomizers which terminate in the nozzles indicated at 14—14 directed toward the center of the chamber $10^a$ and toward the source of treatment gas shortly to be described, the fluid supply header 11 being supplied by a pipe 22 communicating with a tank 23 or other receptacle for containing the supply of material to be treated, a preheater 24 and a pump 100 being interposed in the pipe line 22 for raising the temperature of the fluid and supplying such fluid to the nozzles 14 respectively, the fluid being conveniently vaporized in the present form of apparatus by means of a relatively low pressure of less than fifty atmospheres established by the pump 100 instead of by compressed air. For introducing into the chamber $10^a$ the air or other treating gas employed in the desiccation of the atomized spray coming from the nozzles 14, we employ a gas supply header 16 preferably disposed centrally in the chamber $10^a$ and communicating with the interior of the casing $10^a$ by orifices 17—17 which are preferably radially disposed at the margin of the bell formed outlet 101 of the header 16 and have their orifices arranged parallel to the radii of such bell mouthed orifice as indicated at 18 (Fig. 3), whereby the air is centrifugally directed to all parts of the chamber $10^a$. For the purpose of supplying gas to the apparatus in a state most readily absorptive of moisture, to the end that the desiccation of fluid and recovery of the solid content thereof may be most rapidly performed, the gas is introduced into the supply header 16 from a heater 27, wherein we mount in the chamber 10 a radiator 104 connected by a pipe 25 to any convenient source of heat supply (not shown) and provide a fan 105 for drawing air in through the intake 106, and ejecting it into the header 16. The orifice of the intake 107 of the fan and 108 of the casing are preferably oppositely disposed to the end that the highest degree of heat to such air and exhaust 109 of the fan and the inlet 110 of the header 16 are desirably oppositely disposed in order to facilitate the forcing of the air into the header 16.

Figures 2, 3:
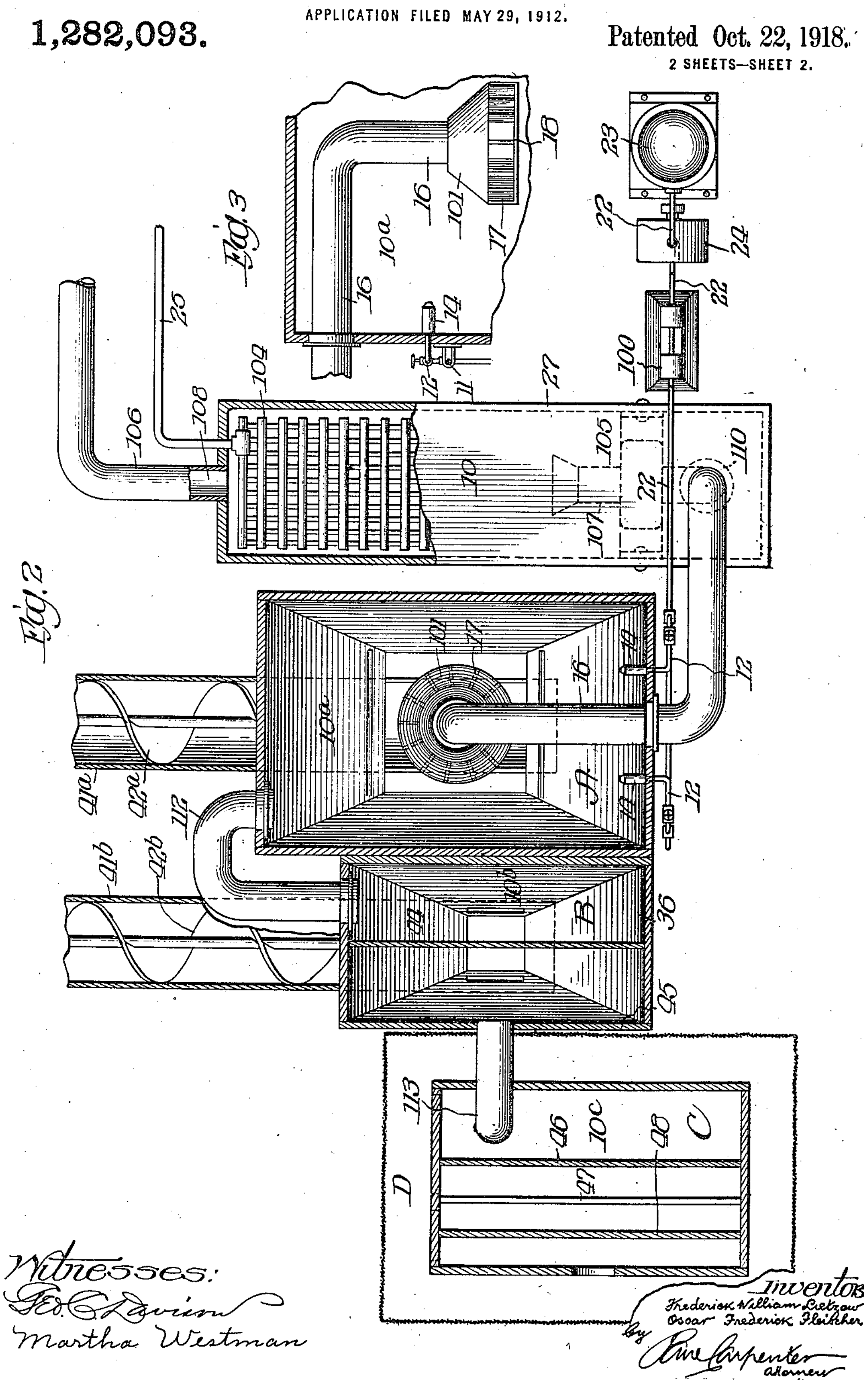
Fig. 2 is a plan view, partly in horizontal section, of details of the construction of the apparatus of Fig. 1.
Fig. 3 is a transverse sectional view taken on the line III—III of Fig. 1.

It will also be seen on inspecting Figs. 1 and 2 that while we employ a plurality of hopper bottoms as indicated at 35 and 36 for removing the contents of the chambers $10^a$ and $10^b$ we equip each of said chambers with the trough and conveyer devices indicated at $41^a$, $42^a$ and $41^b$, $42^b$, respectively, the contents of the chamber $10^c$ being deposited adjacent the doors 111. For interrupting the flow of exhaust gas through the apparatus and thereby in aid of the recovery of any particles of the treated material carried by such exhaust gas we arrange in the casings $10^b$ and $10^c$ a series of vertical baffle members 44, 45, 46, 47 and 48, communication between the chambers 10 and $10^a$ being established by the header 16, between the chambers $10^a$ and $10^b$ by a pipe 112 and between the chambers $10^b$ and $10^c$ by a pipe 113. As a final means for recovering any fine particles, we surround the chamber $10^c$ with screen walls forming a chamber $10^d$ from which the gas finally escapes to the atmosphere.

In carrying out our improved process by means of our improved apparatus above described, it is to be noted that the finely divided fluid supplied to the chamber $10^a$ by means of atomizers 14 is directed to the center of the chamber and is met thereabout by streams of air coming from the orifices 17 of the header 16. The air supplied to such orifices is desirably as thoroughly dried as many be and is preferably intromitted into the chamber $10^a$ at a temperature of 200 degrees Fahrenheit or upward to the end that a constant temperature of not less than 150 degrees Fahrenheit may be maintained in said chamber at all times, the temperature of the chamber for the most efficient operation being about 160 degrees Fahrenheit within our experience. Thus since we have found that by using dried air and maintaining such a relatively high temperature as last mentioned the solid contents of the atomized fluid are desiccated and powdered substantially instantaneously upon emission from the orifices of the atomizers 14, and this without becoming either cooked or overheated, or, on the other hand, insufficiently dried and recovered in a practically useless moist condition. Such portions of the desiccated product thus obtained as are not as a matter of course immediately precipitated by gravity against the rising streams of heated air and deposited forthwith adjacent the orifice of the hopper 35 tend to be directed against the baffle members 44, 45, 46, 47 and 48, and thereupon to be deposited in either the hopper 36 in the settling chambers $10^b$, or in the settling chamber $10^c$, as above suggested. Such particles still remaining in suspension are restrained from egress by the interrupter members covering the walls of the settling chamber $10^d$, and similarly deposited.

Since the casing we employ in our said construction is of but a single thickness, any particles of desiccated product which may adhere thereto may be easily shaken off by striking the casing with a suitably padded mallet which will also serve to loosen any particles which may have adhered to any of the baffle members, after which the slides and trays may be respectively dumped and opened and any residue of the product accumulated thereby discharged into the hoppers or other suitable receptacles.

In carrying out our process above described we find two things especially expedient; firstly, to introduce the air through the orifices 17 at a sufficiently high temperature in order to desiccate the atomized fluid instantaneously upon its entrance to the casing, and, secondly, to discharge such air as well from the chamber $10^a$ as from the orifices 17 with sufficient velocity to at all times maintain motion in the treatment gas in order to avoid any substantial humidification, or saturation of any part of the fluid content of the apparatus, and in order not only to prevent the formation of any vapor-charged areas but to prevent the accumulation of excess pressure in the apparatus.

By carrying out our improved process in the manner described, we find that we are enabled to attain a substantially dry product, that is to say, assuming in the rooms containing the apparatus a relative humidity of 50 by hygrometer test, we have a relative humidity of less than 10 in the chamber $10^a$ so that there is no vapor charged area whatever at any point within the several chambers, and that the fumes as finally expelled from the apparatus are of a relative humidity much less than the atmosphere of such room. This is advantageous from two different aspects, first, that of the product, since a dry product is assured, and, second, that of cost of maintenance and operation of the equipment, since the absence of moisture largely prevents sticking of the desiccated material to the sides of the apparatus and to the baffle members, slides and doors, as well as to the air inlets and atomizers. We further find that in the case of milk powder we are enabled to produce a cleaner and better colored product than has heretofore been known to us, manifesting not only the absence of oxidized but also the avoidance of caramelized or scorched material; that we are enabled to produce finely granulated and more impalpable powder than has heretofore been obtained, thus one under normal conditions not likely to cake, and one having no tendency to settle to the bottom of or float upon the surface of the liquid used as a vehicle in preparing it for use, one most quickly "soluble" in water and therefore one most readily prepared for use, and consequently one the largest field of general utility; and that notwithstanding the fineness of the powder the loss of the solids has been practically reduced to a negligible quantity.

Other advantages of our present process will be apparent to those who are skilled in the art to which it pertains.

Having thus described our invention and illustrated its use what we claim as new and desire to secure by Letters Patent is:

1. The method of desiccating fluids consisting in atomizing the fluid, and directing the atomized fluid across a desiccating chamber, introducing heated air into the chamber, adjacent the horizontal center thereof and some distance below the atomized liquid when introduced into the chamber, and directing such heated air laterally and outwardly in the chamber, permitting the atomized fluid to fall through the rising strata of introduced heated air, collecting dry powder in said chamber below the point of introduction of air into the chamber and discharging the air and vapor from the chamber at a point above the atomized liquid when introduced into the chamber.

2. The method of desiccating fluids consisting in atomizing the fluid, and directing the atomized fluid across a desiccating chamber, introducing heated air into the chamber, adjacent the horizontal center thereof and some distance below the atomized liquid when introduced into the chamber, and directing such heated air laterally and outwardly in the chamber, permitting the atomized fluid to fall through the rising strata of introduced heated air, collecting dry powder is said chamber below the point of introduction of air into the chamber and discharging the air and vapor from the chamber.

In testimony whereof we have hereunto signed our names in the presence of the two subscribed witnesses.

FREDERICK WILLIAM LIETZOW.
OSCAR FREDERICK FLEISCHER.

Witnesses:
PAUL CARPENTER,
MARTHA WESTMAN.